United States Patent [19]

Pan

[11] Patent Number: 5,663,812
[45] Date of Patent: Sep. 2, 1997

[54] REFLECTION-TYPE SCANNER

[75] Inventor: Ampere Pan, Taipei Hsien, Taiwan

[73] Assignee: Primax Electroncis, Ltd., Taipei Hsien, Taiwan

[21] Appl. No.: 417,190

[22] Filed: Apr. 5, 1995

[51] Int. Cl.$^6$ ........................................ H04N 1/04
[52] U.S. Cl. ................. 358/474; 358/498; 364/705.01
[58] Field of Search ........................... 358/481, 474, 358/400, 496, 497, 498; 364/705.01, 708, 709.1, 709.2; 382/312; H04N 1/04

[56] References Cited

U.S. PATENT DOCUMENTS

| | | | |
|---|---|---|---|
| 4,244,019 | 1/1981 | Anderson | 395/200.05 |
| 4,819,166 | 4/1989 | Si et al. | 364/200 |
| 5,115,374 | 5/1992 | Hongoh | 361/393 |
| 5,331,434 | 7/1994 | Kikinis | 358/474 |
| 5,477,238 | 12/1995 | Aharanson et al. | 345/168 |
| 5,532,728 | 7/1996 | Krams et al. | 347/257 |
| 5,544,045 | 8/1996 | Garland et al. | 364/419.03 |

FOREIGN PATENT DOCUMENTS 61-03357  6/1994  Japan .

*Primary Examiner*—Edward L. Coles, Sr.
*Assistant Examiner*—Madeleine Av Nguyen
*Attorney, Agent, or Firm*—The Kline Law Firm

[57] ABSTRACT

A reflection-type scanner that can be mounted inside a host computer case of a computer to scan an object to be scanned includes a housing device to be disposed inside the host computer case, an image pick-up device mounted inside the housing device for scanning the object, and a feed-in device constructed inside the housing device to move the object to be scanned by the image pick-up device. The reflection-type scanner of present invention no longer requires a moving space for scanning as in the prior art, but stabilizes the scanning speed and direction, and simplifies the operation in that a user only needs to insert the object to be scanned between the rollers or place it on the tray of the scanner and the scanner takes over the rest of the work. Moreover, the scanner can be integrated into the computer system so that the user need not bother setting up the scanner in the computer and constructing the wires and connectors between the scanner and the conputer, and the cost can be lowered.

25 Claims, 4 Drawing Sheets

REFLECTION-TYPE SCANNER

FIELD OF THE INVENTION

The present invention is related to a scanner, and more particularly to a reflection-type scanner.

BACKGROUND OF THE INVENTION

In recent years, the scanner is becoming increasingly popular among the computer peripheral equipments. The scanners generally include sheet-feed type and hand-held type, but when in use, both types need an extra space to rest on or move around.

Besides, in the prior art, a scanner and a computer are separate devices. Users who buy a scanner have to complete the connection between the scanner and the computer and the set up work by themselves. For those who are not familiar with the computer in this respect, the installation step has been a problem.

Moreover, when operating a scanner, for example a hand-held type, one has to move the scanner through the object to be scanned so as to complete the scanning process. Yet, one of the drawbacks is the difficulty in moving the scanner by hand at a constant speed in a regular direction, otherwise resulting in the distortion of the scanned image.

SUMMARY OF THE INVENTION

An object of the present invention is to provide a reflection-type scanner that can be mounted inside a host personal computer case to save the space required for scanning movement, simplify the operation steps and lower the cost, and can scan an image at a constant speed in a regular direction. Besides, no installation problem should bother the user because the scanner can be integrated into the computer system.

In accordance with the present invention, a reflection-type scanner to be mounted inside a host computer case of a computer to scan an object to be scanned includes a housing device to be disposed inside the host computer case, an image pick-up device mounted inside the housing device for scanning the object, and a feed-in device constructed inside the housing device to move the object to be scanned by the image pick-up device.

Besides, a reflection-type scanner may further include a driving device mounted inside the housing device to control a feed-in action executed by the feed-in device.

In an first preferred embodiment according to the present invention, a top cap can be pivotally mounted on the housing device such that a user can gain access to an inside of the reflection-type scanner to clean up the inside and remove the object when the object fails to pass through the image pick-up device.

The image pick-up device can include a light source projecting a light onto the object, a charge coupled device receiving a reflected light from the object and producing an electric signal, a reflecting mirror which reflects the reflected light from the object such that the reflected light vertically enters into the charge coupled device, a lens mounted between the charge coupled device and the reflecting mirror for focusing the reflected light to the charge coupled device, and a control circuit processing the electric signal sent by the charge coupled device to present an image of the object e.g. on a screen of the computer.

In the first preferred embodiment, the image pick-up device can be a contact image sensor (CIS).

In the first preferred embodiment, the driving device can have a gear assembly electrically connecting thereto a motor, where the motor is one selected from the group consisting of a direct-current motor and a step motor. A feed-in detecting device can be further included at one side of the top cap, electrically connected to the motor and detecting a position of the object so as to control a timing for starting the motor to send the object into the reflection-type scanner.

It is desired that the feed-in device includes a first roller mounted on the top cap, a second roller disposed inside the housing device at a place corresponding to the first roller, a feed-in passage mounted between the first roller and the second roller for providing a space through which the object enters the reflection-type scanner, and a spring mounted in the housing device either beneath the second roller or above the first roller for urging the first and second rollers to clamp and guide therebetween the object regardless of a width of the object, in which when the motor is activated, the gear assembly drives the rollers to rotate such that the object is driven to pass through the image pick-up device.

The housing device has an external adjusting plate to define an entering width for the object.

In a second preferred embodiment according to the present invention, the driving device may have a gear assembly electrically connecting thereto a motor, and the feed-in device can be a tray on a top of the image pick-up device for placing the object to be scanned. The object therefore can be carried into the image pick-up device by means of an in/out action of the tray driven by the driving device. The tray can further include an elastic cap to hold the object on the tray. A section of the tray for resting thereon the object can be made of a transparent material. The elastic cap can be made of a transparent material.

In a third preferred embodiment according to the present invention, a reflection-type scanner further includes a from cap pivotally mounted on one side of the housing device such that a user can gain access to an inside of the reflection-type scanner to clean up the inside and remove the object when it fails to pass the image pick-up device.

In the third preferred embodiment, the image pick-up device includes a light source projecting a light onto the object, a charge coupled device receiving a reflected light from the object and producing an electric signal, a lens mounted on one side of the charge coupled device for focusing the reflected light to the charge coupled device, and a control circuit processing the electric signal sent by the charge coupled device to present an image of the object e.g. on a screen of the computer, wherein the image pick-up device is a contact image sensor (CIS).

In the third preferred embodiment, the driving device desirably includes a gear assembly electrically concocting thereto a motor. A feed-in detecting device can be mounted at one side of the front cap, electrically connected to the motor and detecting a position of the object so as to control a timing for starting the motor to send the object into the reflection-type scanner. The feed-in device can have a first roller mounted to the front cap, a second roller disposed inside the housing device at a place corresponding to the first roller, a feed-in passage mounted between the first roller and the second roller to provide a space through which the object enters the reflection-type scanner, and a spring mounted to one end of the first roller inside the front cap for urging the first and second rollers to clamp and guide therebetween the object regardless of a width of the object, in which when the motor is activated, the gear assembly drives the rollers to rotate such that the object enters the reflection-type scanner from one end of the feed-in passage, passes through the image pick-up device, and comes out from the other end of the feed-in device to leave the reflection-type scanner.

The object can be opaque.

The reflection-type scanning device uses an interface to electrically communicate with the computer having a mother board and the interface can be selected from a group consisting of an interface in the computer, a disc driver standard interface, and an interface circuit provided on the mother board of the computer.

The present invention may best be understood through the following description with reference to the accompanying drawings, in which:

DETAILED DESCRIPTION OF THE PREFERRED EMBODIMENT

Figure 1:
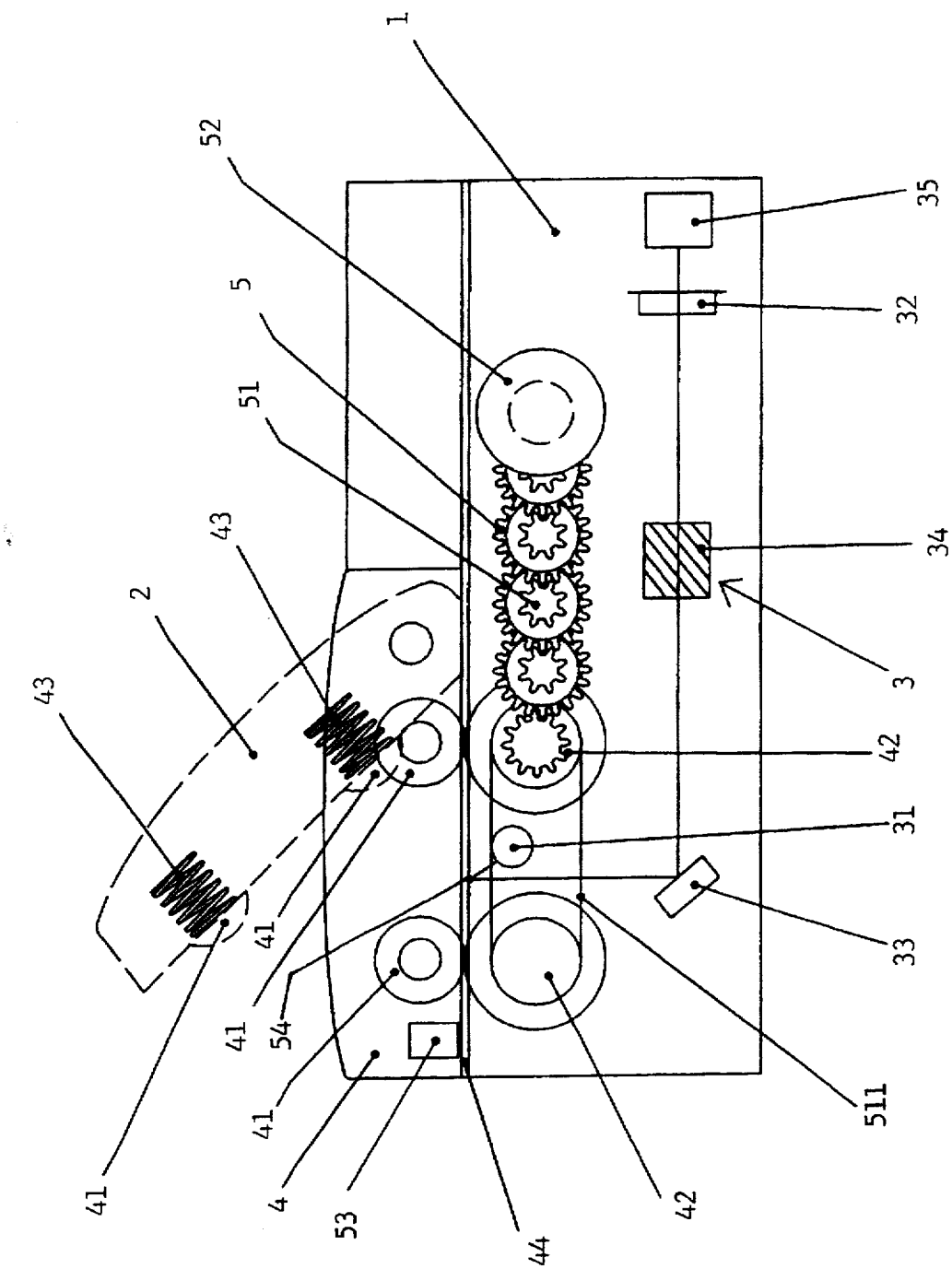
FIG. 1 is a side view of a first preferred embodiment of a reflection-type scanner according to the present invention.

With reference to FIG. 1, there is shown a housing device 1, a top cap 2 pivotally mounted thereto, an image pick-up device 3, a feed-in device 4, and a driving device 5 wherein the image pick-up device 3 includes a light source 31, a charge coupled device 32, a reflecting mirror 33, a lens 34, and a control circuit 35; the feed-in device 4 includes two first rollers 41, two second rollers 42, two springs 43, and a feed-in passage 44; and the driving device 5 has a gear assembly 51, a motor 52, and a feed-in detecting device 53 where the gear assembly may further includes a timing belt 511.

Figure 2:
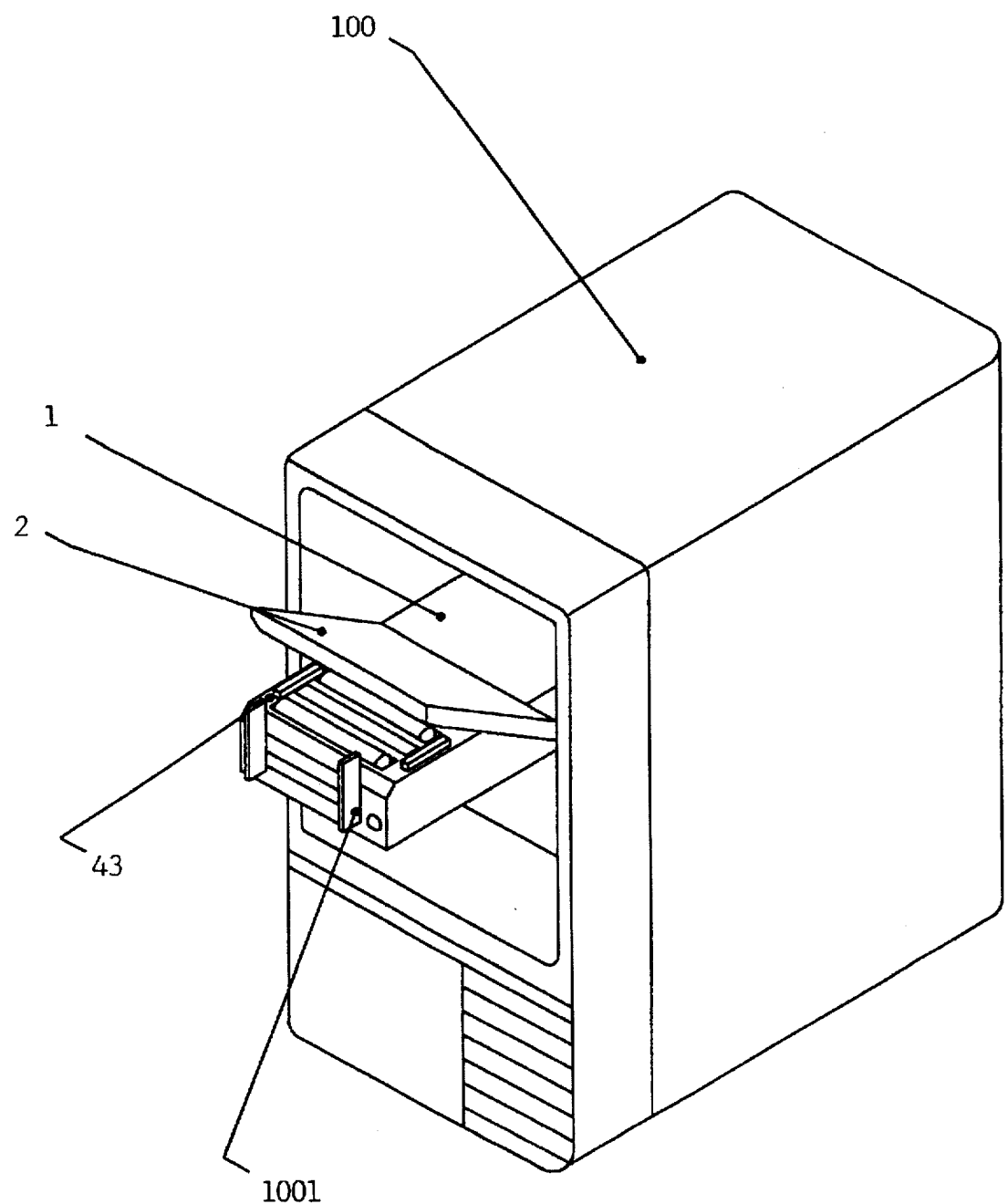
FIG. 2 is a schematic view of a reflection-type scanner mounted to a host computer case according to the present invention.

Referring to FIG. 2, the scanner according to the present invention is entirely located within a housing device 1 which can be a casing or a machine frame so long as the housing device 1 can be fixed inside the host computer case 100 of a personal computer, in the same way that a hard disc driver or a CD ROM driver is installed therein.

In the first preferred embodiment shown in FIG. 1, a user pushes the object to be scanned into the feed-in passage 44 from its entrance. When the feed-in detecting device 53 detects the entrance of the object, the motor 52 starts to drive the gear assembly 51 which further enables the rotation of the first rollers 41 and the second rollers 42. The rotation of the rollers 41 and 42 transmits the object through the image pick-up device 3, and meanwhile, the image pick-up device 3 is activated to proceed the scanning action. The light source 31 projects a light onto the object, and the light reflected by the object and then by the reflecting mirror 33 vertically enters the charge coupled device 32 to be focused via the lens 34. The charge coupled device 32 produces an electric signal which then is outputted to the control circuit 35 for further processing so as to be transformed into an image presented on the screen of the personal computer through the computer interface.

Two springs 43 can either be mounted above the first rollers 41 inside the top cap 2 (as shown in FIG. 1) or beneath the second rollers 42. The springs 43 serve to urge the first rollers 41 and the second rollers 42 to clamp therebetween the object so that the object can be guided smoothly regardless of the thickness of the object. When the object is completely inside the scanner, the feed-in detecting device 53 does not detect anything on the moment and the scanning action of the image pick-up device 3 lasts for a while by software programming until the object completely passes through the scanning point 54.

To release the object from the scanner, the motor 52 can be set to a reverse rotation mode by a software program stored inside the control circuit to drive the gear assembly 51 and further the rollers 41 and 42 in reverse direction. Alternatively, the software program inside the control circuit 35 may be designed to reverse the rotation of the motor 52 when the portion of the object inside the scanner has been up to a predetermined length. By this way, the object can be withdrawed from the scanner without being traced by the feed-in detecting device 53. Referring to FIG. 2, a top cap 2 is mounted on the top of the housing device 1 by pivot so as to facilitate the housing device 1 to be pulled out of the host computer case 100, and in such a way a user can easily open the top cap 2 to clean the inside of the scanner or remove anything stuck in the scanner.

The light source 31, the charge coupled device 32, the reflecting mirror 33, and the lens 34 of the image pick-up device 6 can be replaced by a contact image sensor (CIS). A single CIS includes the functions of the light source 31, the charge coupled device 32, the reflecting mirror 33, and the lens 34, and the space for the scanner in the host computer case can be accordingly reduced to a great extent.

Figure 3:
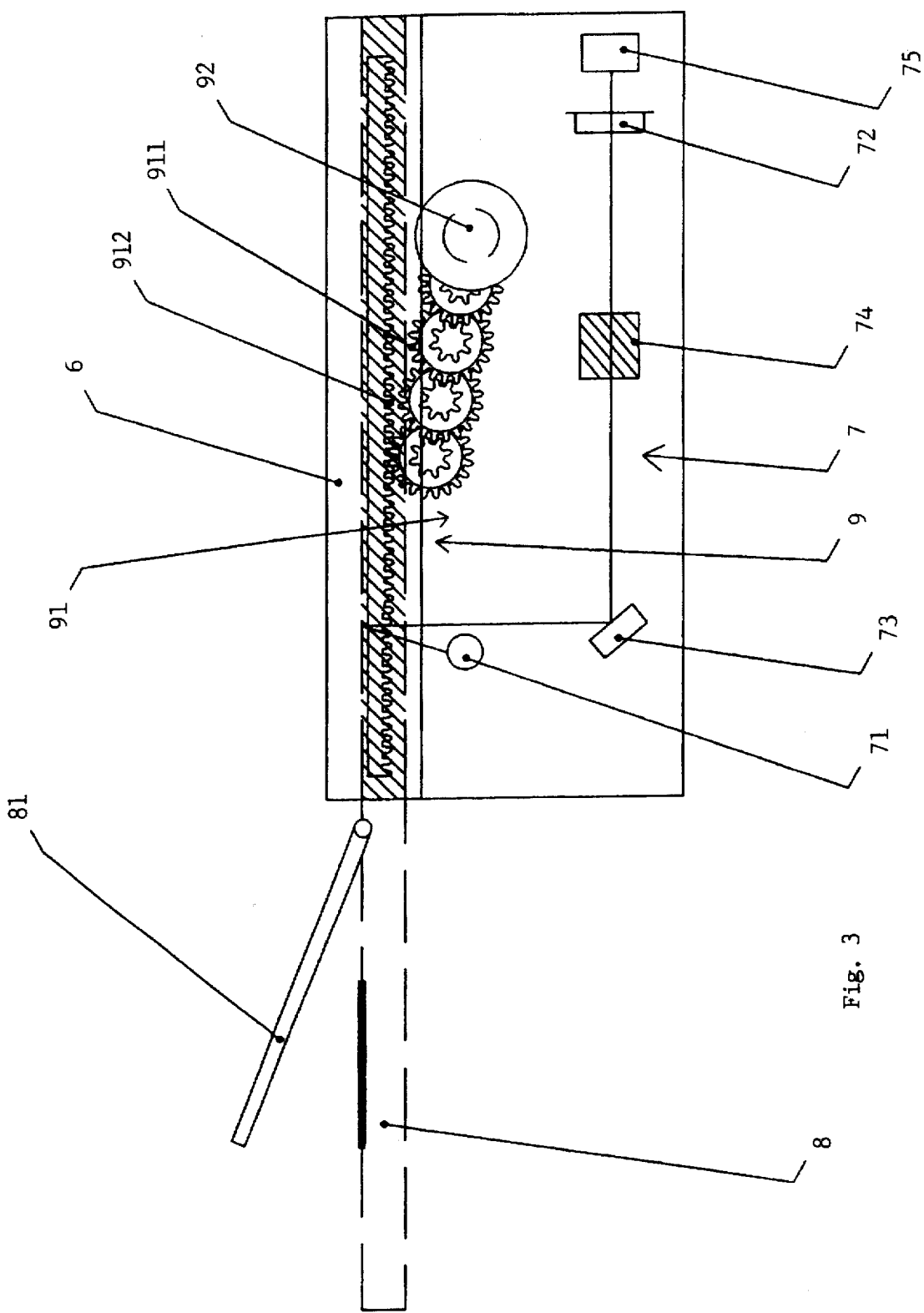
FIG. 3 is a side view of a second preferred embodiment of a reflection-type scanner according to the present invention.

As best seen in FIG. 3, the second preferred embodiment of the present invention includes a housing device 6, an image pick-up device 7, a feed-in device 8, and a driving device 9. Like the first embodiment, the image pick-up device 7 has a light source 71, a charge coupled device 72, a reflecting mirror 73, a lens 74, and a control circuit 75. The feed-in device 8 is a tray including a frame and a piece enclosed by the frame and made of a tranparent material. On the tray 8, there can be an elastic cap 81 for holding the object. The driving device 9 can include a gear assembly 91 and a motor 92 wherein the gear assembly 91 has a plurality of gears 911 and a gear rack 912.

The difference between the first and the second preferred embodiments is in the feed-in method. In the second embodiment, the motor 92 drives the gear assembly 91 in which the gears 911 are continueously meshed with the gear rack 912 to move the tray 8 outwards. Then the object to be scanned can be placed on the tray 8 and held thereon by the elastic cap 81, and the tray 8 can be pushed back to the scanner. During the process of being pushed back, the tray 8 carries the object through the image pick-up device 7 by which the object is scanned. After the scanning process is finished, the tray 8 moves outwards such that the object can be removed. The functions of the housing device 6 and the image pick-up device 7 in the second embodiment are the same as in the first embodiment. Additionally, the moving in/out mechanism of the tray 8 in relation to the scanner can be referred to the structure of a CD ROM driver. When the image pick-up device 7 is mounted on top of the tray 8, the piece enclosed by the frame of the tray 8 can be made of an opaque material but the elastic cap 81 is made of a transparent one.

The housing device 1 can be sized as a 5¼ or a 3½ inch disk driver for which a personal computer usually reserves a space. In the first embodiment, an adjusting plate 1001 (as shown in FIG. 2) can be externally mounted on the housing device 1 to further guide the insertion of the object into the scanner.

Figure 4:
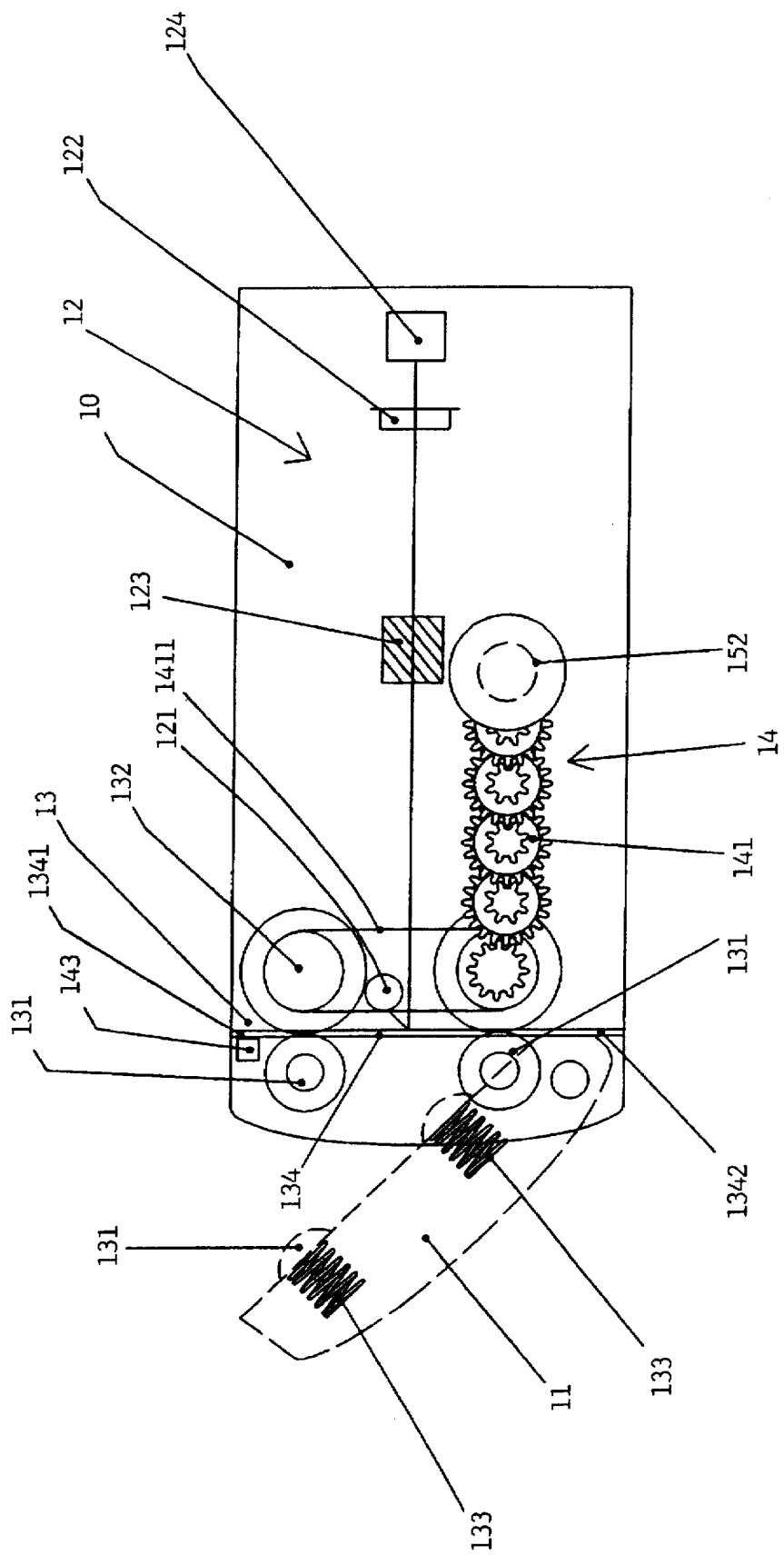
FIG. 4 is a side view of a third preferred embodiment of a reflection-type scanner according to the present invention.

As best seen in FIG. 4, a third preferred embodiment of the present invention includes a housing device 10, a top cap 11 pivotally mounted on the housing device 10, an image pick-up device 12, a feed-in device 13, and a driving device 14 wherein the image pick-up device 12 includes a light source 121, a charge coupled device 122, a lens 123, and a control circuit 124; the feed-in device 13 includes two first rollers 131, two second rollers 132, two springs 133, and a feed-in passage 134 having one end 1341 for entering the object into the scanner and another end for ejecting the object out of the scanner, these two ends being positioned over a front end of the housing device 10 for feeding the object through the scanner; and the driving device 14 has a gear assembly 141, a motor 142, and a feed-in detecting device 143 for detecting entrance of said object into one end 1341 of the feed-in passage 134 wherein the gear assembly further includes a timing belt 1411.

One of the differences between FIG. 1 and FIG. 4 is the change of the relative position of the front cap 11, the image pick-up device 12 and the feed-in device 13. In the first embodiment, the motor 52 has to reversely rotate to send the object out of the scanner through the way it is sent in, but in the third embodiment, the object enters the scanner from one end 1341 of the feedin passage 134 and runs out directly through the other end 1342 over its front end. Besides, the change of the relative position of the devices inside the scanner results in the direct vertical projection of the light onto the charge coupled device 122, so no reflecting mirror is required.

In the third preferred embodiment, the entire scanner can be installed inside the host computer case when not in use in a way that the surfaces of the scanner and the host computer case are flush, while in use, the scanner is pulled outwards from the host computer case such that the feed-in passage 134 can receive and release an object to be scanned.

As regards the interface between the scanner and the computer according to the present invention, it can be the disk driver standard interface that comes with the computer, an interface designed by the manufacturer, or an interface circuit on the mother board of the computer.

From the above description and illustration, it is to be seen that the present invention provides a reflection-type scanner that can be directly mounted inside a personal computer case and no longer requires an extra space for resting on or moving around as the prior art does. Furthermore, the present scanner can scan objects at a stable scanning speed in a regular direction, and the operation can be simplified because a user only needs to insert the object to be scanned between the rollers or place it on the tray of the scanner and the scanner will take over the rest of the work. Moreover, for those users who do not own a scanner but a computer, a scanner of the present invention can be added to the position of the reserved disk driver socket in the computer while those who do not have a computer can purchase one that is equipped with the scanner of the present invention. As a result, the cost can be lowered. In the latter case, the scanner has been integrated into the computer system, so the user need not bother setting up the scanner in the computer and constructing wires and connectors between the scanner and the computer.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A scanner for scanning an object comprising:

a housing device adapted to be mounted inside a host computer case of a computer;

an image pick-up device mounted inside said housing device for scanning said object to produce an electric signal;

a control circuit for processing said electric signal;

a feed-in device constructed inside said housing device for moving said object through said image pick-up device to scan said object;

a driving device mounted inside said housing device for driving said feed-in device; and a software program stored inside said control circuit for controlling said driving device;

wherein said driving device drives said feed-in device, under the control of said software program when scanning said object, to move said object into said scanner and then reversely move said object out of said scanner to scan said object.

2. A scanner as claimed in claim 1, further comprising a top cap pivotally mounted on said housing device such that a user can gain access to an inside of said scanner.

3. A scanner as claimed in claim 2 wherein said feed-in device comprises:

a first roller mounted on said top cap;

a second roller disposed inside said housing device at a place corresponding to said first roller;

a feed-in passage provided between said first roller and said second roller to provide a space through which said object enters said scanner; and a spring mounted in said housing device for urging said first and second rollers to clamp and guide therebetween said object regardless of a width of said object, in which when said motor is activated, said gear assembly drives said rollers to rotate such that said object can pass through said image pick-up device.

4. A scanner as claimed in claim 3 wherein said housing device has an external adjusting plate to define an entering width for said object.

5. A scanner as claimed in claim 3 wherein said spring is mounted beneath said second roller.

6. A scanner as claimed in claim 3 wherein said spring is mounted above said first roller.

7. A scanner as claimed in claim 1 wherein said driving device comprises:

a gear assembly; and a motor for driving said gear assembly.

8. A scanner as claimed in claim 4 wherein said motor is a direct-current motor.

9. A scanner as claimed in claim 4 wherein said motor is a step motor.

10. A scanner as claimed in claim 1, further comprising a feed-in detecting device for detecting entrance of said object into said scanner, and wherein when the entrance of said object into said scanner is detected by said feed-in detecting device, said driving device starts driving said feed-in device, under the control of said software program, to move said object in and out of said scanner.

11. A scanner as claimed in claim 1 wherein said image pick-up device comprises:
a light source for projecting a light onto said object;
a charge coupled device for receiving a reflected light from said object and producing an electric signal;
a reflecting mirror which reflects said reflected light from said object such that said reflected light vertically enters into said charge coupled device; and
a lens mounted between said charge coupled device and said reflecting mirror for focusing said reflected light to said charge coupled device.

12. A scanner as claimed in claim 1 wherein said image pick-up device is a contact image sensor (CIS).

13. A scanner as claimed in claim 1 wherein said feed-in device comprises a tray for holding said object wherein said tray, with said object held inside, is driven in and out of said scanner through said image pick-up device by said driving device when scanning said object.

14. A scanner as claimed in claim 13 wherein said tray further comprises an elastic cap to hold said object on said tray.

15. A scanner as claimed in claim 14 wherein a section of said tray for resting thereon said object is made of a transparent material.

16. A scanner as claimed in claim 14 wherein said elastic cap is made of a transparent material.

17. A scanner as claimed in claim 1 wherein said object is opaque.

18. A scanner as claimed in claim 1 wherein said scanner uses an interface in said computer to electrically communicate with said computer having a mother board.

19. A scanner as claimed in claim 18 wherein said interface is a disc drive standard interface.

20. A scanner as claimed in claim 18 wherein said interface is an interface circuit provided on said mother board of said computer.

21. A scanner as claimed in claim 1 wherein after said object moved up to a predetermined length into said scanner by said driving device, said software program starts reversing said driving device to move said object out of said scanner.

22. A scanner as claimed in claim 1 wherein said housing device is sized as a standard 3.5" or 5.25" disc drive form factor commonly used in personal computers.

23. A scanner for scanning an object comprising:
a housing device adapted to be mounted inside a host computer case of a computer;
an image pick-up device mounted inside said housing device for scanning said object to produce an electric signal;
a control circuit for processing said electric signal;
a feed-in device constructed inside said housing device for moving said object through said image pick-up device, said feed-in device comprising a feed-in passage having a first end for entering said object into said scanner and a second end for ejecting said object out of said scanner, said first and second ends of said feed-in passage being positioned over a front end of said housing device for feeding said object through said scanner;
a driving device mounted inside said housing device for driving said feed-in device; and
a software program stored inside said control circuit for controlling said driving device;
wherein said driving device drives said feed-in device, under the control of said software program, to move said object from said first end of said feed-in passage through said image pick-up device to scan said object, and then out of said second end of said feed-in passage whereby said object is fed into and ejected from said scanner over its front end.

24. A scanner as claimed in claim 23 wherein said housing device is sized as a standard 3.5" or 5.25" disc drive form factor commonly used in personal computers.

25. A scanner as claimed in claim 23 further comprising a feed-in detecting device for detecting entrance of said object into said first end of said feed-in passage, and wherein when the entrance of said object into said feed-in passage of said scanner is detected by said feed-in detecting device, said driving device starts driving said feed-in device to move said object through said feed-in passage.

* * * * *